United States Patent Office 3,101,439
Patented Aug. 20, 1963

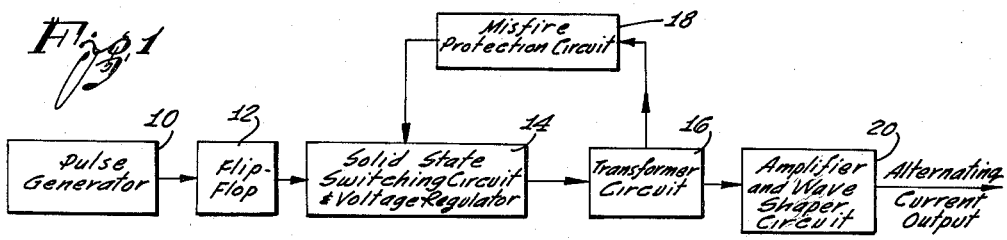
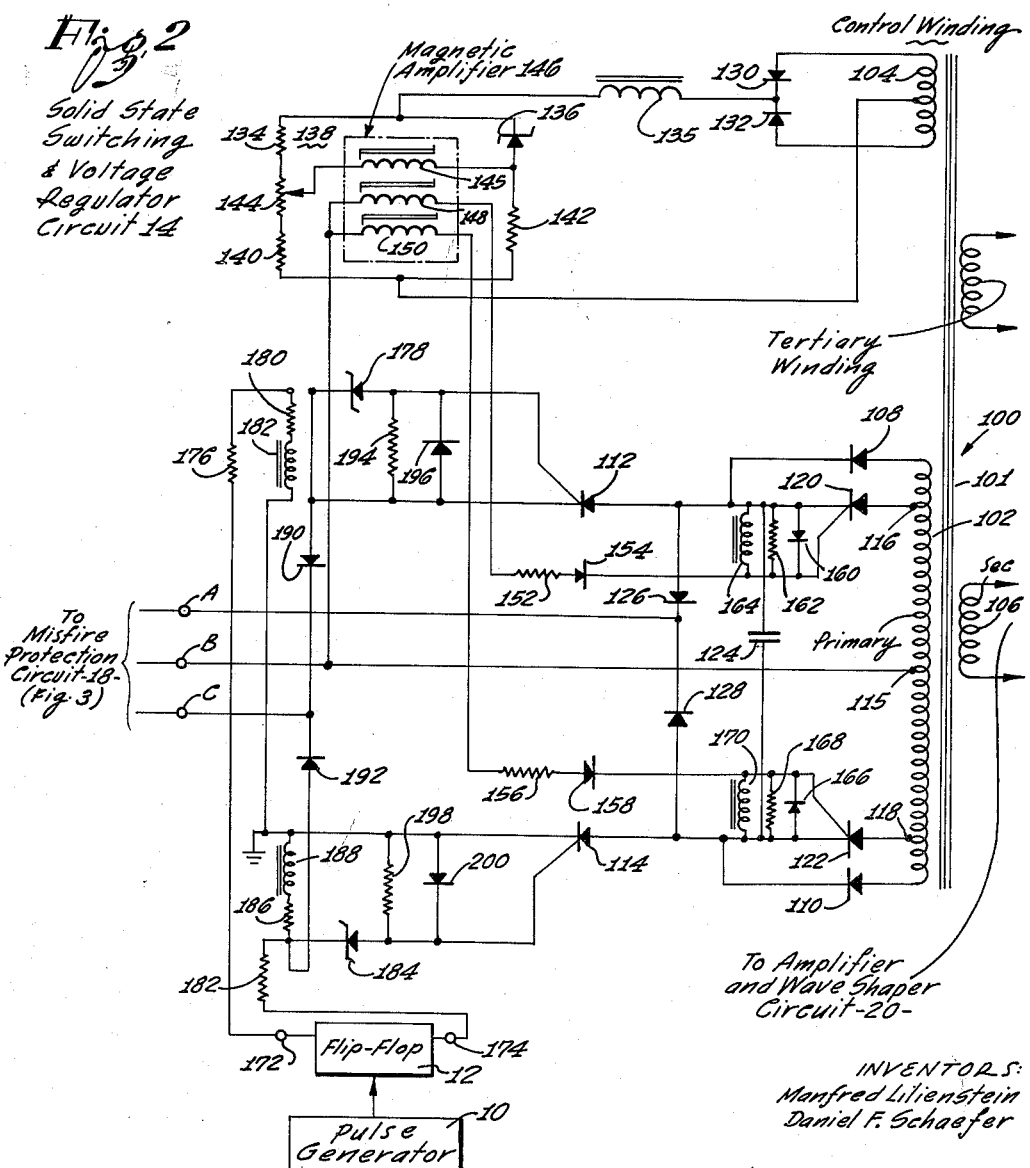

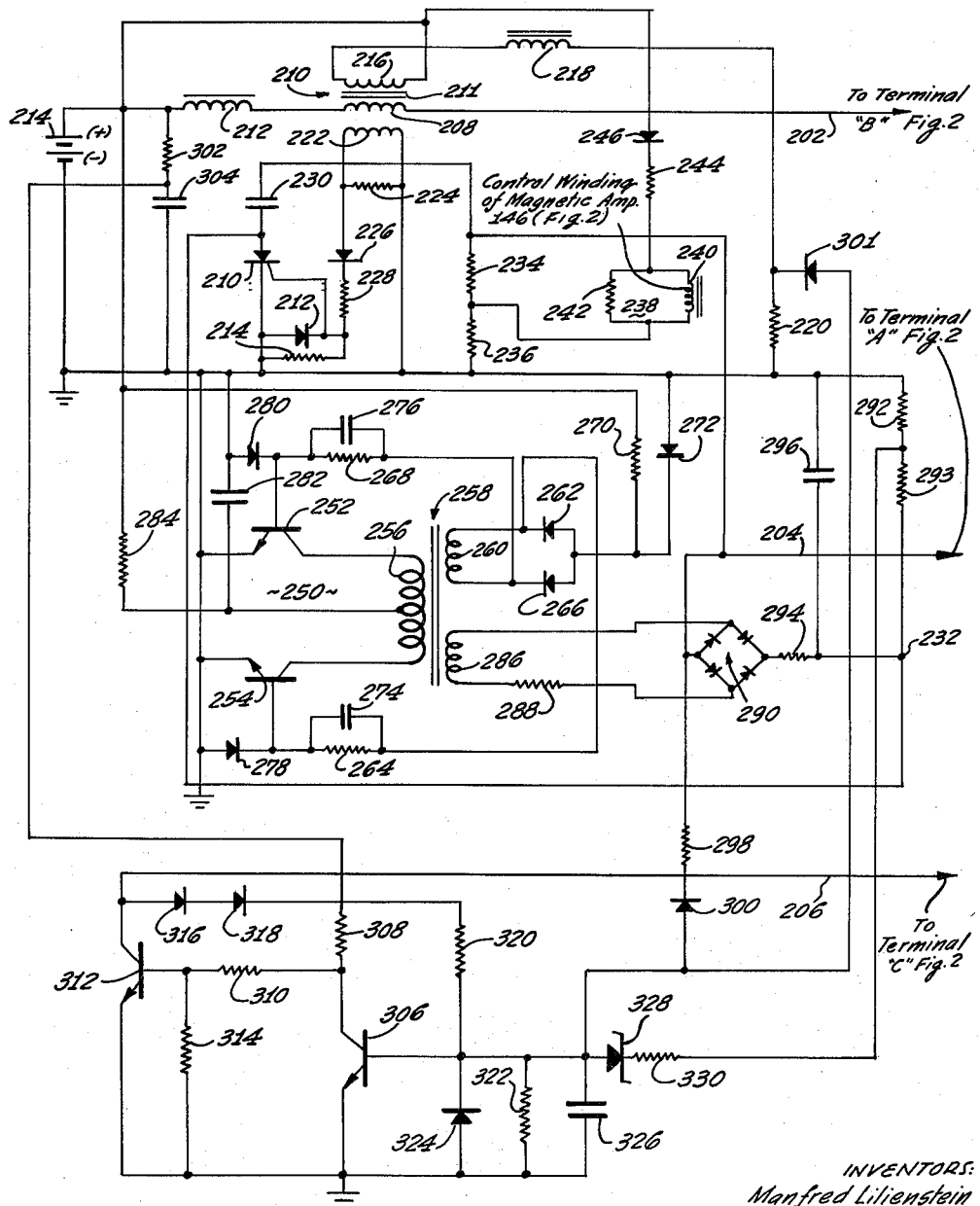

---

3,101,439
CONTROL CIRCUITS FOR STATIC INVERTERS
Manfred Lilienstein, Rolling Hills, and Daniel F. Schaefer, Long Beach, Calif., assignors to American Electronics, Inc., Fullerton, Calif., a corporation of California
Filed Oct. 20, 1961, Ser. No. 146,654
6 Claims. (Cl. 321—45)

The present invention relates to improved control circuits for particular use in static inverters which change direct current into alternating current, but which have general application; and the invention relates more particularly to improved control circuits for voltage regulation and protective purposes in static inverters and in other electronic and electrical systems.

Copending application Serial No. 92,706, filed March 1, 1961, in the name of Manfred Lilienstein discloses and claims an improved inverter system for changing direct current power into single-phase or multi-phase alternating current power and for achieving this conversion without the need for mechanical moving parts. The system disclosed in the copending application is a three-phase system, with control circuits and means being provided in the system for voltage regulation of the individual phases and for protecting the components and circuitry of the system in the event of misfire of the solid state devices included therein. These solid state devices are controlled, as fully described in the copending application, so as to produce the alternating current power through a gated switching action.

The circuit and system of the present invention also has utility in a single-phase, or in a multi-phase static inverter system, of the type described in the copending application. For the purpose of the present description, the control circuits of the invention will be described as used in conjunction with a single-phase static inverter. It will be understood, however, that by duplication of the equipment and circuitry to be described, the system of the invention can similarly be used in multi-phase static inverters. It will also be evident as the description proceeds, that the voltage regulation and protective control circuits of the invention have general utility in other types of systems.

It is often important in single-phase systems for the amplitude of the output voltage to be maintained constant, and it is most important in multi-phase systems that the amplitude of the different phases be precisely regulated so that equal amplitudes of all the phases may be maintained.

An important object of the present invention is to provide an improved voltage regulating control circuit which may be used in a single-phase static inverter for precise regulation of the output voltage, and which may be used in each of the phase channels of a multi-phase static inverter for maintaining precise symmetry in the amplitudes of the different phases of the output voltage.

Another object of the invention is to provide such an improved voltage regulating circuit and system which has general utility wherever precise amplitude regulation of an output signal is required.

Another object of the invention is to provide such an improved regulating circuit which is simple in its construction, and which utilizes rugged components so as to be capable of handling high power levels to be used in relatively high power systems.

A more particular object is to provide such an improved regulating circuit and system which carries out its voltage regulating function without the need for mechanically moving parts, and which utilizes solid state switching devices in the embodiment to be described to achieve its rugged characteristic and high power capability.

A problem that has been encountered in the past in static inverter systems using solid state switching devices is the tendency under some conditions for the devices to misfire and thereby cause damage to the circuitry and associated components. This misfire condition in effect places a direct short circuit on the system and, unless some protective measures are taken, damage will occur.

Another object of the invention, accordingly, is to provide an improved control circuit for use in a static inverter system which is capable of responding to a misfire condition in the system effectively to de-energize the system and prevent damage thereto.

Another object is to provide such an improved protective circuit which has general utility and which is capable of responding to over-load conditions to provide a control or indicating signal.

A more particular object is to provide such an improved protective circuit, which includes solid state switching devices in the embodiment to be described, and which performs its protective purposes without the need for mechanical moving parts.

Other objects and advantages of the invention will become evident from a consideration of the following description when taken in conjunction with the accompanying drawings, in which:

FIGURE 1 is a block diagram of an inverter system for changing direct current into alternating current and which may incorporate the control circuits of the present invention;

FIGURE 2 is a circuit diagram of a voltage regulator circuit constructed in accordance with one embodiment of the invention and which may be incorporated into the system of FIGURE 1; and FIGURE 3 is a misfire protection circuit constructed in accordance with a further embodiment of the invention and which also may be included in the system of FIGURE 1.

The inverter system of FIGURE 1 includes a pulse generator 10. The pulse generator may, for example, take the form of an appropriate transistorized oscillator circuit which includes a source of direct current potential. The source of direct current potential may, for example, take the form of a battery. The direct current potential from the source is converted by the pulse generator 10 into into a series of output pulses.

The output pulses from the pulse generator 10 may have any desired repetition rate. The frequency of these output pulses determines the frequency of the alternating current output derived from the system of FIGURE 1.

The pulse generator 10 is coupled to a flip-flop 12, and the output pulses from the pulse generator trigger the flip-flop between its two stable states. Flip-flop circuits, per se, are well known to the art, and any appropriate circuit may be used. The flip-flop 12 produces a rectangular output wave as it is triggered between its two stable states. The rectangular output wave from the flip-flop 12 is applied to a solid state switching circuit and voltage regulator unit 14. As will be described in conjunction with FIGURE 2, the rectangular wave from the flip-flop is used to control the unit 14 in a manner such that a high power rectangular wave output signal may be derived from the unit.

The unit 14, in turn, is coupled to a transformer circuit 16. The transformer circuit also will be described in conjunction with FIGURE 2. The output from the transformer circuit is applied to an amplifier and wave shaper circuit 16. The latter circuit serves to shape the signal from the transformer circuit into, for example, a sinusoidal signal of a relatively high power level.

The system of FIGURE 1 includes a misfire protection circuit 18. This circuit, as will be described in conjunction with FIGURE 3, protects the system from damage due to short circuit currents. These short circuit currents are caused by a misfire condition in the solid state switches included in the unit 14, as will be described.

The system of FIGURE 1 is similar to the corresponding system described in the copending application Serial No. 92,706. For a multi-phase static inverter, a system like the system of FIGURE 1 is included for each of the phases. For the multi-phase system, however, it is usual to replace the flip-flop 12 with a ring counter, or similar device, so that appropriately phased rectangular wave gating signals may be sequentially applied to the unit 14 in each of the different phases.

The solid state switching and voltage regulator system 14, as shown in circuit detail in FIGURE 2, includes a transformer 100 which, in turn, includes a single magnetic core 101. A primary winding 102 is wound on the core 101, and a control winding 104 and a secondary winding 106 are also wound on the core.

The sides of the primary winding 102 are respectively connected to the anodes of a pair of diodes 108, 110. The cathode of the diode 108 is connected to the anode of a controlled solid state device, such as a silicon controlled rectifier 112; and the cathode of the diode 110 is connected to the anode of a controlled solid state device, such as a silicon controlled rectifier 114.

The silicon controlled rectifiers to be described herein, including the silicon controlled rectifiers 112 and 114, may be of any well known type. As is well known, a silicon controlled rectifier is a solid state device which may be selectively controlled to be rendered conductive or nonconductive, and which is capable of switching relatively high power levels. The silicon controlled rectifier is considered to be equivalent in functional characteristics to the well known Thyratron discharge tubes.

The primary winding 102 of the transformer 100 also has a center tap 115 which is connected to a terminal B. The terminal B derives a direct current exciting potential for the silicon controlled rectifiers 112 and 114 through the misfire protection circuit 18, as will be described in conjunction with FIGURE 3.

The primary winding 102 also has additional intermediate taps 116 and 118, these taps being positioned symmetrically on opposite sides of the center tap 115. The intermediate tap 116 is connected to the anode of a silicon controlled rectifier 120, and the intermediate tap 118 is connected to the anode of a silicon controlled rectifier 122. The cathode of the silicon controlled rectifier 120 is connected to the anode of the silicon controlled rectifier 112, and the cathode of the silicon controlled rectifier 122 is connected to the anode of the silicon controlled rectifier 114.

A capacitor 124 is connected to the cathodes of the silicon controlled rectifiers 120 and 122. A pair of diodes 126 and 128 have their cathodes connected together, and the anodes of the diodes are respectively connected to the anodes of the silicon controlled rectifiers 112 and 114. The cathodes of the diodes are connected to a terminal A, which is connected to the protection circuit 18 of FIGURE 3, as will be described.

The sides of the control winding 104 of the transformer 100 are respectively connected to the anodes of a pair of diodes 130 and 132. The cathodes of the diodes 130 and 132 are connected through an inductance choke coil 135 to a resistor 134 and to the cathode of a Zener diode 136 in a bridge circuit 138. The center tap of the control winding 104 is connected to a resistor 140 and to a resistor 142 in the bridge circuit.

The resistor 134 may, for example, have a resistance of 500 ohms, and it is connected to one terminal of a potentiometer 144. The resistor 140 may, for example, also have a resistance of 500 ohms, and the latter resistor is connected to the other terminal of the potentiometer. The potentiometer 144 has a movable arm which is connected to one terminal of the control winding 145 of a magnetic amplifier 146.

The resistor 142 may, for example, have a resistance of 1.6 kilo-ohms, and it is connected to the anode of the Zener diode 136. The resistor 142 and the anode of the Zener diode 136 are also connected to the other terminal of the control winding 145 of the magnetic amplifier 146.

The magnetic amplifier 146 has a pair of output windings 148 and 150. One terminal of each of these windings is connected to the above-mentioned terminal B. The other terminal of the output winding 148 is connected through a resistor 152 to the anode of a diode 154, and the other terminal of the winding 150 is connected through a resistor 156 to the anode of a diode 158. The resistors 152 and 156 may each have a resistance of 180 ohms.

The cathode of the diode 154 is connected to the gate electrode of the silicon controlled rectifier 120. A diode 160 has its anode connected to the cathode and its cathode connected to the gate electrode of the silicon controlled rectifier 120. A resistor 162 is shunted across the diode 160, as is an inductance coil 164. The resistor 162 may, for example, have a resistance of 47 ohms. A diode 166 has its anode connected to the cathode and its cathode connected to the gate electrode of the silicon controlled rectifier 122. A resistor 168 is connected across the diode 166, as is an inductance coil 170. The resistor 168 may, for example, have a resistance of 47 ohms.

As noted above, the pulse generator 10 may be of any suitable known type, as may the flip-flop 12. The frequency of the pulse generator, as also mentioned, determines the frequency of the output of the system. The flip-flop 12 has a pair of output terminals 172 and 174. The output terminal 172 is connected through a resistor 176 to the cathode of a Zener diode 178 and to a resistor 180. The resistor 180 is connected to a grounded inductance coil 282. The resistor 176 may, for example, have a resistance of 200 ohms, and the resistor 180 may, for example, have a resistance of 100 ohms.

The output terminal 174 is connected through a resistor 182 to the cathode of a Zener diode 184 and to a resistor 186. The resistor 186 is connected to a grounded inductance coil 188. The resistor 182 may have a resistance of 200 ohms, and the resistor 186 may have a resistance of 100 ohms.

The junction of the resistors 176 and 178 is connected to the anode of a diode 190, and the junction of the resistors 182 and 186 is connected to the anode of a diode 192. The cathodes of the diodes 190 and 192 are connected to a terminal C. The terminal C is connected to the misfire protection circuit 18 of FIGURE 3, as will be described.

The anode of the Zener diode 178 is connected to the gate electrode of the silicon controlled rectifier 112. A resistor 194 and a diode 196 are connected between the gate and the cathode of the silicon controlled rectifier 112. The resistor 194 may, for example, have a resistance of 47 ohms.

The anode of the Zener diode 184 is connected to the gate of the silicon controlled rectifier 114. A resistor 198 and a diode 200 are connected between the gate and the cathode of the silicon controlled rectifier 114. The resistor 198 has a resistance, for example, of 47 ohms.

The circuit of FIGURE 2 operates generally in a manner similar to the corresponding circuit in the system of the copending application Serial No. 92,706. As mentioned above, a direct current exciting potential is applied to the center tap of the primary winding 102 of the transformer 100. The silicon controlled rectifiers 112 and 114 are alternately switched between conductive and nonconductive states by the action of the flip-flop 12. This switching action causes current to flow in a first half of the primary winding 102 and in a first direction for a first half-cycle of each operating cycle; and the switching action causes current to flow in the other half of the primary 102 and in the opposite direction for a second half-cycle of each operating cycle.

As a result of the switching action described in the preceding paragraph, and of the corresponding flow of primary currents in the primary winding 102, an alternating current secondary voltage is induced in the secondary winding 106. The alternating current secondary voltage, as mentioned above, may be amplified and shaped to produce a sine wave at the output of the system. The amplitude of the sine wave may be precisely regulated in a manner now to be described.

An alternating current voltage is also induced in the control winding 104 by the above-described switching action of the silicon controlled rectifiers 112 and 114. This voltage appears across the control winding, and it is related in amplitude to the secondary voltage across the secondary winding 106. Any variation in the amplitude of the alternating current secondary voltage across the winding 106 is accompanied by a corresponding variation in the amplitude of the alternating current control voltage across the control winding 104. The alternating current control voltage across the control winding is rectified by the full wave rectifying diodes 130 and 132. The resulting direct current control voltage is smoothed by the choke coil 135 and applied across the bridge 138.

The direct current control voltage across the bridge 138 is applied across the control coil 145 of the magnetic amplifier 146. The resulting voltage across the output windings 148 and 150 of the magnetic amplifier are applied to the respective gate electrodes of the silicon controlled rectifiers 120 and 122. In this manner, the silicon controlled rectifier 120 is controlled to fire at a time within the first half-cycle of each operating cycle when its anode voltage rises to a firing threshold which, in turn, is dependent upon the control voltage introduced to its gate electrode. This control voltage is, itself, determined by the amplitude of the voltage across the control winding 104, which in turn is related to the amplitude of the secondary voltage across the secondary winding 106.

Likewise, the silicon controlled rectifier 122 is controlled to fire at a time within the second half cycle of each operating cycle when its anode voltage rises to a firing threshold determined by the control voltage applied to its gate electrode. The gate voltage of the silicon controlled rectifier 122 is also controlled in accordance with the amplitude of the control voltage across the winding 104.

When the silicon controlled rectifiers 120 and 122 are fired, the current flow through the silicon controlled rectifiers 112 and 114 flows through the silicon controlled rectifiers 120 and 122, rather than through the diodes 108 and 110. This switching action, therefore, decreases the effective turns on the primary winding 102, and produces a corresponding increase in the secondary voltage for the latter portion of each of the half cycles. The secondary voltage across the secondary winding 106 is increased, therefore, in each half cycle by the firing of the silicon controlled rectifiers 120 and 122; and the time at which these silicon controlled rectifiers are fired in each operating cycle is, in turn, dependent upon the amplitude of the secondary voltage.

The control may be such, therefore, that regulation is provided for the secondary voltage at an amplitude established by the setting of the potentiometer 144. Any tendency for the secondary voltage to vary from the set value, is accompanied by an earlier or later firing of the silicon controlled rectifiers 120 and 122 in each operating cycle, depending upon the direction of the variation. This earlier or later firing of the silicon controlled rectifiers 120 and 122 alters the secondary voltage in a direction to compensate for the tendency.

To prevent any likelihood of saturation in the core 101 of the transformer, it is desirable that the circuits of the silicon controlled rectifiers 120 and 122 be balanced, and that the firing control of the silicon controlled rectifiers 120 and 122 be symmetrical. Saturation effects in the core 101 of the transformer could arrest the switching action of the system and produce a loss in output voltage.

The misfire protection circuit 18 of FIGURE 3 includes a lead 202 which is connected to the above-mentioned terminal B of FIGURE 2; and it also includes a lead 204 which is connected to the above-mentioned terminal A and a lead 206 which is connected to the above-mentioned terminal C. The lead 202 is connected through the main winding 208 of a magnetic inductance device 210 having a core 211, and through an inductance coil 212 to the positive terminal of a source 214 of direct voltage. The source 214 is represented as a battery which may have a direct current potential, for example, of 25 volts, and whose negative terminal is grounded.

The magnetic core inductance device 210 includes a second winding 216 connected to the source 214 through the inductance coil 212, and also connected through an inductance coil 218 and through a resistor 220 to ground. The resistor 220 may, for example, have a resistance of 75 ohms.

As mentioned above, the terminal B applies direct current exciting potential to the center tap of the primary winding 102 in FIGURE 2. During normal operation of the system, the current flow through the winding 216 of the device 210 produces a flux in the core 211 which over-rides the flux produced by the winding 208 and which drives the core 211 to saturation in one direction. However, in the event of a misfire in the circuit of FIGURE 3, the resulting high short circuit current flow through the winding 208, and the resulting flux in the core 211 of the device 210, drives the core to saturation in the opposite direction.

The magnetic core inductance device 210 includes a third winding 222 on the core 211. When the magnetic flux in the core is reversed due to the above-described short-circuit condition; therefore, in the presence of the misfire short-circuit current flow in the primary winding of the transformer of FIGURE 2, a voltage pulse is produced across the winding 222 of the device 211.

One side of the winding 222 is grounded and the other is connected to a grounded resistor 224. The resistor 224 may, for example, have a resistance of 1 kilo-ohm. The ungrounded side of the winding 224 is also connected to the anode of a diode 226. The cathode of the diode 226 is connected to a resistor 228 which may, for example, have a resistance of 180 ohms.

The resistor 228 is connected to the gate electrode of a silicon controlled rectifier 210, and the resistor is also connected to the cathode of a diode 212 and to a grounded resistor 214. The cathode of the silicon controlled rectifier 210, and the anode of the diode 212 are grounded. The resistor 214 may, for example, have a resistance of 47 ohms.

The anode of the silicon controlled rectifier is coupled through a capacitor 230 to the lead 204 which, as mentioned above, is connected to the aforementioned terminal A of the circuit of FIGURE 2. The capacitor 230 may, for example, have a capacitance of 30 microfarads. The anode of the silicon controlled rectifier is also directly connected to a point 232 in the circuit of FIGURE 3. The lead 204 is connected to a resistor 234 which, in turn, is connected to a grounded resistor 236. The resistor 234 may have a resistance of, for example, 25 kilo-ohms, and the resistor 236 may have a resistance of 5 kilo-ohms.

The junction of the resistors 234 and 236 is connected to one side of a shunt network 238. The shunt network includes a control winding 240 associated with the magnetic amplifier 146 of FIGURE 2, and a parallel resistor 242. The resistor may have a resistance, for example, of 470 ohms. The other side of the shunting network 238 is connected to a resistor 244. The resistor 244 may have a resistance of 5 kilo-ohms, for example, and it is connected to the cathode of a diode 246. The anode of the diode 246 is connected to the lead 202. This latter lead, as mentioned above, is connected to the terminal B of the circuit of FIGURE 2.

The circuit of FIGURE 3 includes a converter circuit 250 which serves to produce a relatively high direct current voltage, of the order of 150 volts, for example. The converter 250 includes a pair of NPN transistor 252 and 254, each of the transistors having a grounded emitter. The collectors of the transistors are connected to the opposite sides of the primary winding 256 of a transformer 258. The transformer has a secondary winding 260. One side of the secondary winding 260 is connected to the cathode of a diode 262 and to a resistor 264. The other side of the secondary winding 260 is connected to the cathode of a diode 266 and to a resistor 268.

The anodes of the diodes 262 and 266 are connected to a grounded resistor 270 which may, for example, have a resistance of 10 kilo-ohms, and which is shunted by a diode 272. The resistor 264 may have a resistance, for example, of 1 kilo-ohm, and it is shunted by a capacitor 274. The resistor 268 may also have a resistance of 1 kilo-ohm, and it is shunted by a capacitor 276. The capacitors 274 and 276 may each have a capacity, for example, of .003 microfarad.

The resistor 264 is connected to the cathode of a diode 278, and the resistor 268 is connected to the cathode of a diode 280. The anodes of the diodes 278 and 280 are grounded.

The primary winding 256 of the transformer 258 has a center tap connected to a grounded capacitor 282 and to a resistor 284. The capacitor 282 may, for example, have a capacitance of 1 microfarad. The resistor 284 may, for example, have a resistance of 25 ohms, and it is connected to the positive terminal of the source 214.

The transistorized converter circuit 250 is a known type of push-pull transistor oscillator, and the oscillator produces an output signal across an output winding 286 of the transformer 258. This output signal is passed through a resistor 288 to a full-wave bridge rectifier 290. The resistor 288 may, for example, have a resistance of 2.7 kilo-ohms.

The resulting direct current output voltage from the converter circuit 250 appears across the full-wave bridge rectifier 290. One terminal of the bridge rectifier 290 is connected through a resistor 294 to a pair of series-connected resistors 292 and 293. The resistor 292 has a value, for example, of 27 kilo-ohms and is grounded. The resistor 293 is connected to the point 232, and it has a value, for example, of 91 kilo-ohms. The resistor 294 may, for example, have a resistance of 6.8 kilo-ohms. The resistors 292 and 293 are shunted by a capacitor 296 which may, for example, have a capacity of .015 microfarad. The other terminal of the bridge rectifier 290 is connected to the lead 204 and to a resistor 298. The resistor 298 may, for example, have a resistance of 10 kilo-ohms, and it is connected to the cathode of a diode 300.

The source 214 is shunted by a series connected resistor 302 and capacitor 304. The resistor 302 may have a resistance, for example, of 10 ohms, and the capacitor 304 may have a capacity of, for example, 100 microfarads. The junction of the resistor 302 and the capacitor 304 is connected to the collector of an NPN transistor 306 through a resistor 308. The resistor 308 may, for example, have a resistance of 2 kilo-ohms.

The emitter of the transistor 306 is grounded, and the collector is connected through a resistor 310 to the base of a second NPN transistor 312. The resistor 310 may, for example, have a resistance of 2 kilo-ohms. The emitter of the transistor 312 is grounded, and the base of the transistor is connected to a grounded resistor 314. The latter resistor may, for example, have a resistance of 3.3 kilo-ohms.

The collector of the transistor 312 is connected through a pair of diodes 316 and 318 and through a resistor 320 to the base of the transistor 306. The resistor 320 may, for example, have a resistance of 10 kilo-ohms. The base of the transistor 306 is connected to a grounded resistor 322 which is shunted by a diode 324 and by a capacitor 326. The resistor 322 may have a resistance, for example of 2 kilo-ohms and the capacitor 326 may, for example, have a capacitance of .01 microfarad.

The base of the transistor 306 is also connected to the anode of the diode 300, to the anode of a diode 301, and to the anode of a Zener diode 328. The cathode of the diode 301 is connected to the resistor 220. The cathode of the Zener diode 328 is connected through a resistor 330 to the junction of the resistors 292 and 293. The resistor 330 may, for example, have a resistance of 20 kilo-ohms. The transistor 306 is normally conductive, and the transistor 312 is normally non-conductive.

In the event of a misfire and resulting short circuit condition in the circuit of FIGURE 2, the misfire protection circuit 18 of FIGURE 3 functions to disable the silicon controlled rectifiers 112 and 114 in FIGURE 2. This is achieved by decreasing the voltage on the lead 204 of FIGURE 3 and, therefore, on the terminal A of the circuit of FIGURE 2. The resulting voltage drop at the terminal A causes the diodes 126 and 128 in FIGURE 2 to become conductive. The conductivity of the diodes 126 and 128 reduces the anode voltage of the silicon controlled rectifiers 112 and 114 to a point at which they become non-conductive.

Under normal operation of the solid state switching circuit of FIGURE 2, the point 232 and the anode of the silicon controlled rectifier 210 connected thereto, are established at a direct current voltage of the order of 150 volts by the converter 250 of FIGURE 3. This voltage is developed by the converter in the manner described above, and it appears across the rectifier bridge 290.

As described above, the presence of a short circuit current in the lead 212 causes a pulse of voltage to appear across the winding 222 of the magnetic core inductance device 210. This voltage causes the silicon controlled rectifier 210 to become conductive, which suddenly causes the anode thereof to be established at ground potential.

The resulting negative-going pulse passes through the capacitor 230 to the lead 204 to be applied to the terminal A of the circuit of FIGURE 2, and this latter pulse passes through the diodes 126 and 128 to the anodes of the silicon controlled rectifiers 112 and 114. At the same time, and in a manner to be described, the firing signals are removed from the gate electrodes of the silicon controlled rectifiers 112 and 114.

The negative-going pulse referred to above also passes through the voltage divider resistors 234 and 236 to control the current through the control winding 240 of the magnetic amplifier 146 of FIGURE 2. This control serves to remove the firing signal from the silicon controlled rectifiers 120 and 122 of FIGURE 2.

Therefore, the presence of a short circuit condition in the circuit of FIGURE 2, due to a silicon controlled rectifier misfire condition therein, causes the misfire protection circuit 18 of FIGURE 3 to render the silicon controlled rectifiers non-conductive and to terminate the operation of the circuit of FIGURE 2.

When the negative pulse passes through the capacitor 230 in response to the above-described short circuit condition, the cathode of the diode 300 swings negative to render the diode conductive. The conductivity of the diode 300 causes the base of the transistor 306 to swing negative causing that transistor to become non-conductive. When the transistor 306 swings to its non-conductive state, the transistor 312 is caused to become conductive.

When the transistor 306 is established in its conductive condition, the resulting collector current of that transistor causes the potential of the lead 206, and of the terminal C of FIGURE 2, to be drawn down to ground potential, so that the diodes 190 and 192 in the circuit of FIGURE 2 become conductive. The conductivity of the diodes 190 and 192 effectively blocks the application of the firing signals from the flip-flop 12 to the gate electrodes of the silicon controlled rectifiers 120 and 122 through the Zener diodes 178 and 184.

Therefore, the above-mentioned short circuit condition in the circuit of FIGURE 2 causes a negative signal to be applied to the terminals A and C by the misfire protection circuit 18 of FIGURE 3. This negative signal causes the silicon controlled rectifiers 120 and 122 to be deactivated in the above-described manner to de-energize the system.

At the termination of the pulse across the winding 222 of the magnetic core induction device 210, the capacitor 296 recharges through the resistors 293 and 292 and the potential at the point 232 increases exponentially in the positive direction. This increase continues until the threshold of the Zener diode 328 is exceeded, and the transistor 306 is again rendered conductive. The transistor 312 is then driven back to its non-conductive condition, and this causes the positive voltage to be introduced through the diodes 316 and 318 to the base of the transistor 306.

The result of the above-described action is that a positive pulse is introduced through the Zener biode 328 to cause the transistor 306 to become conductive and the resistor 306 is held in its conductive state by the positive voltage introduced to its base electrode from the collector of the non-conductive transistor 312 through the diodes 316 and 318. The transistor 306 remains conductive until another negative pulse is introduced to its base electrode through the diode 300.

The action described in the preceding paragraphs enables the diodes 190 and 192 to be rendered non-conductive by the resulting positive voltage at the terminal C after a predetermined time interval, so that the firing signals can automatically again be applied to the gate electrodes of the silicon controlled rectifiers 120 and 122 to re-establish normal operation in the system.

The invention provides, therefore, improved control circuits which are particularly suited for use in static inverters for regulation and protective purposes, but which have general utility.

While a particular embodiment of the invention has been shown and described, modifications may be made and it is intended in the following claims to cover such modifications as fall within the scope of the invention.

What is claimed is:

1. In a system for producing an alternating current output and which includes: generating means for producing a pair of oppositely phased gate signals, and first and second main switching devices coupled to said generating means to be sequentially actuated by said oppositely phased gate signals in a succession of recurrent operating cycles, the combination of: a transformer including a primary winding having first and second sides respectively connected to said first and second main switching devices, said primary winding further having a center tap and first and second intermediate taps disposed on opposite sides of said center tap, said transformer further including a secondary winding across which an alternating current secondary voltage is produced, potential supplying means connected to said center tap on said primary winding for introducing an exciting potential thereto, circuit means coupled to said transformer for deriving a regulating signal representative of the amplitude of said alternating current secondary voltage, first and second auxiliary switching devices connected respectively to said first and second main switching devices and to said first and second intermediate taps on said primary winding, and a control circuit coupled to said circuit means and to said first and second auxiliary switching devices for enabling said first and second auxiliary switching devices to be sequentially conductive at points in successive half cycles of said alternating current voltage as determined by said regulating signal effectively to connect said first and second main switching devices to said first and second intermediate taps.

2. In a system for producing an alternating current output and which includes: generating means for producing a pair of oppositely phased gate signals, and first and second main switching devices coupled to said generating means to be sequentially actuated by said oppositely phased gate signals in succession of recurrent operating cycles, the combination of: a transformer including a primary winding having first and second sides respectively connected to said first and second main switching devices, said primary winding further having a center tap and first and second intermediate taps symmetrically disposed on opposite sides of said center tap, said transformer further including a secondary winding across which an alternating current secondary voltage is produced, potential supplying means connected to said center tap on said primary winding for introducing an exciting potential thereto, said transformer further including a control winding for producing an alternating current control signal related to the amplitude of said alternating current secondary voltage, circuit means coupled to said control winding and including rectifying means for producing a direct current regulating signal having an amplitude related to the amplitude of said alternating current secondary voltage, first and second auxiliary switching devices connected respectively to said first and second main switching devices and to said first and second intermediate taps on said primary winding selectively to connect said first and second main switching devices to said intermediate taps, and a control circuit coupled to said circuit means and to said first and second auxiliary switching devices for enabling said auxiliary switching devices to be sequentially conductive at points in successive half cycles of said alternating current secondary voltage as determined by the amplitude of said direct current regulating signal.

3. In a system for producing an alternating current output and which includes: generating means for producing a pair of oppositely phased gate signals, and first and second controlled solid state devices coupled to said generating means to be sequentially rendered conductive by said oppositely phased gate signals in a succession of recurrent cycles, the combination of: a transformer including a primary winding having first and second sides respectively connected to said first and second controlled devices, said primary winding further having a center tap and first and second intermediate taps symmetrically disposed on opposite sides of said center tap, said transformer further including a secondary winding across which an alternating current secondary voltage is produced and a control winding for producing an alternating current control signal related to the amplitude of said secondary voltage, potential supplying means connected to said center tap of said primary winding for introducing a direct current exciting potential thereto, circuit means coupled to said control winding and including rectifying means for producing a direct current regulating signal having an amplitude related to the amplitude of said alternating current secondary voltage; third and fourth controlled solid state devices connected respectively to said first and second controlled devices and to said first and second intermediate taps on said primary winding selectively to connect said first and second controlled devices to said intermediate taps, and a control circuit coupled to said circuit means and to said third and fourth controlled devices for enabling said third and fourth controlled devices to be sequentially conductive at points in successive half cycles of said alternating current secondary voltage as determined by the amplitude of said direct current regulating signal.

4. The combination defined in claim 3 and in which said control circuit includes a magnetic amplifier for effectively amplifying the direct current regulating signal from said circuit means and for applying respective components of the amplified direct current signal to said third and fourth controlled solid state devices.

5. The combination defined in claim 1 and in which said potential supplying means includes a protective circuit responsive to a current flow in said primary winding in excess of a predetermined threshold for disabling said first and second main switching devices so as to interrupt the current flow in said primary winding.

6. The combination defined in claim 3 and in which said potential supplying means includes a protective circuit responsive to a current flow in said primary winding in excess of a predetermined threshold for rendering said first and second controlled solid state devices non-conductive, said protective circuit including: means interposed between the source of direct current exciting potential and said center tap on said primary winding and responsive to a current flow in said primary winding in excess of an established threshold for producing a trigger pulse, and means coupled to said first and second controlled devices and responsive to said trigger pulse for rendering said first and second controlled devices non-conductive.

References Cited in the file of this patent
UNITED STATES PATENTS

| | | |
|---|---|---|
| 2,959,725 | Younkin | Nov. 8, 1960 |
| 3,010,062 | Van Emden | Nov. 21, 1961 |

OTHER REFERENCES

Electronics, vol. 33, No. 28, June 8, 1960, article by Lilienstein.